3,218,152
PROCESS FOR SEPARATING NON-MOLTEN SLAG
FROM TITANIUM-CONTAINING IRON SAND
Takao Sasabe, Musashino, Tokyo, Japan
No Drawing. Filed Sept. 9, 1964, Ser. No. 395,293
Claims priority, application Japan, Dec. 6, 1960,
35/48,029
3 Claims. (Cl. 75—1)

This is a continuation-in-part of my pending U.S. patent application No. 154,049 filed November 21, 1961 now abandoned.

This invention relates generally to a process for separating titanium components from a titanium-containing iron sand by selectively reducing said titanium-containing iron sand to remove the titanium components.

Since refining of iron sand in a blast furnace is rather difficult, a pig-iron manufacturing electric furnace has been generally used and metallic iron and slag have been obtained in the molten state. However, in order to reduce iron sand which is granular, difficult to reduce, and contains $TiO_2$, an extremely large amount of electric power is consumed.

For the purpose of improving the efficiency in the electric furnace operation described supra, particularly to decrease the power consumption required for smelting iron sand, an improved process has been recently developed in which sponge iron or semi-reduced sponge iron produced by the pre-treatment of raw iron sand is charged in the furnace and smelted therein, instead of immediately charging with raw iron sand. This new process however, results only in the decrease of power consumption to a certain degree.

The inventor has found that, when molding titanium-containing iron sand into pellets, and heating these pellets from room temperature up to a specified temperature range for a relatively short period of time, while in contact with a reducing agent, which causes reduction of the iron oxide to metallic iron, iron balls are formed, which have a hollow center and an outer crust consisting of an outer layer composed of reduced metallic iron and an inner layer composed of slag which contains substantially all the titanium originally contained in the titanium-containing iron sand.

If the thus-formed balls are crushed and magnetically dressed, metallic iron and slag of high titanium contents are easily separated thereby obtaining metallic iron of high purity. In other words, the present invention is based on the surprising discovery that by heating the pelletized iron sand with a special temperature gradient for a relatively short period of time substantially all the $TiO_2$ originally contained in the iron sand will not be reduced and will migrate into non-melted slag. Consequently, slag and metallic iron of high purity is obtained without having to resort to a smelting process in an electric furnace.

An object of this invention is to provide an improved process for removing, simply and economically, titanium components from titanium-containing iron sand and other iron ores similar thereto or the concentrates thereof.

Another object of this invention is to provide a process for removing substantially completely titanium components from titanium-containing iron sand by pelletizing said iron sand, quickly heating the thus obtained iron sand pellets from room temperature up to a specified temperature range for a short period of time while in contact with a reducing agent and separating the formed slag which is in a non-molten state and contains substantially all the titanium originally contained in the iron sand.

A further object of the present invention is to provide a process for removing substantially completely titanium components from titanium-containing iron sand by only roughly crushing the reduced iron sand pellets and magnetically separating the formed slag therefrom.

Additional objects of this invention will become manifest by the following detailed description.

It is well known that when an iron ore is heat-treated in the presence of a suitable reducing agent such as a carbonaceous material, the reducing reaction is gradually accelerated from a temperature near 500° C. The present inventor found, however, that when iron sand pellets are heated from an ambient temperature up to a temperature above 1350° C. before fusion of the pellets by melting takes place, for a relatively short period of time, while in contact with a reducing agent, the reducing reaction proceeds rapidly and the pellets form hollow iron balls, each of which have an outer crust consisting of an outer layer composed of metallic iron and an inner layer composed of slag attached to said outer layer, said slag containing substantially all the $TiO_2$ originally contained in the iron sand. In these iron balls the iron oxide was fully reduced to metallic iron, which formed the outer layer of said iron balls, while the $TiO_2$ was not reduced and migrated into the slag, which formed the inner layer of said iron balls. Therefore, if the reducing reaction is stopped when a temperature is reached, at which the aforesaid hollow iron balls are formed, and are taken out of the furnace, cooled and subjected to a magnetic dressing after crushing, the reduced metallic iron and slag of high titanium content are easily separated. Thus, the essential feature of the present invention resides in heating the pelletized iron sand, while in contact with a reducing agent, up to a specified temperature range with a specified temperature gradient. The most favorable results are obtained when the pelletized iron sand is heated from ambient temperature up to a temperature of 1350° C. to 1500° C. within 30 minutes to 2 hours and 20 minutes.

The temperature gradient, that is, the temperature elevation and the heating time includes two distinctive periods. The first period has a temperature gradient from ambient temperature up to 1000° C. and the second is from 1000° C. to a temperature range of 1350° C. to 1500° C. The second period is more important than the first. That is, the regulation of the heating time in the second period has a more decisive effect on the result of the present invention.

According to this invention the first period, viz, ambient temperature to 1000° C., is carried out for a period of 10 minutes to 1 hour and the second, viz from 1000° C. to a temperature range of 1350° C. to 1500° C., is carried out for a time of 20 minutes to 1 hour and 20 minutes. Practically, the pellets are heated in a reducing furnace from a room temperature up to 1000° C. within 10 minutes to 1 hour, and when this temperature is reached they are subsequently heated to a range of from 1350° C. to 1500° C., at which temperature they are taken out of the reducing furnace. When the first period is carried out for the above mentioned time, the second period of heat-treatment is more effective. In the first period, if the duration is less than 10 minutes, the reduction reaction will be insufficient, even though the subsequent period is carried out according to the present invention, and if the duration is longer than 1 hour, the process is uneconomical. In the second period, if the duration is shorter than 20 minutes, iron oxide will not be completely reduced and, hence, sufficient separation of the metallic iron from the titanium components will not be effected. On the contrary, if the period is longer than 1 hour and 20 minutes, not only will the process be uneconomical, but also the $TiO_2$ will be reduced.

If the temperature exceeds 1500° C., the pellets are softened, thereby destroying the center hollow portion of each ball and the $TiO_2$ in the slag is reduced and migrates into the metallic iron together with carbon. If the temperature is, however, below 1350° C., there is not sufficient separation of the metallic iron from the titanium components. Thus, the heat-treatment according to the present invention is characterized by elevating the temperature of the pellets from an ambient temperature to a temperature range of 1350° C. to 1500° C. for a period of 30 minutes to 2 hours and 20 minutes through two heating periods.

Modification of the heat-treatment is, of course, possible. For instance, the pellets may be heated from an ambient temperature to a temperature range of 800° C. to 1200° C. for 10 minutes to 1 hour in the first period and then further heated from said temperature range to a temperature between 1350° C. and 1500° C. for 20 minutes to 1 hour and 20 minutes. But, when the temperature in the first period is 800° C., the heating time in the second period should be 1 hour and 20 minutes and when the temperature is 1200° C. in the first period the heating time in the second period should be 20 minutes.

However, technically and economically, the most favorable heat-treatment according to the present invention is found to be that in which the pellets are heated from room temperature to 1000° C. in 15 minutes and then from 1000° C. to 1400° C. in 75 minutes.

The pellets may preferably be withdrawn immediately from the reducing furnace when the temperature reaches 1350° C. to 1500° C., but they may be maintained at the temperature for 30 minutes without undesirable results. But, it is undesirable to keep the pellets at that temperature longer than 30 minutes since $TiO_2$ is likely to be reduced and migrate into the metallic iron.

The pellets may be, further charged in a reducing furnace preheated to a certain temperature and then the temperature may be further raised up to the above specified temperature, at which time the pellets may be withdrawn, for the specified period of time, but in this case the time required for raising the temperature to 1000° C. should be 10 minutes after charging the furnace with the pellets, and if possible, a reducing furnace consisting of a low-temperature zone and a high-temperature zone is recommended.

A suitable reducing furnace that can be used in this invention is a vertical type shaft furnace, but a rotary furnace such as a rotary kiln may be used by pre-baking the pellets.

The reducing agent used in this invention may be gaseous, liquid or solid but the reducing temperature and heating period must be controlled as specified supra.

The pellets when withdrawn from the reducing furnace and cooled are in a state where the solid slag containing the $TiO_2$ is attached to the entire inside surface of the spherical metallic iron, and by roughly crushing these pellets the reduced iron can be easily separated from the slag by magnetic separation.

Thus, the present invention is characterized by the following features: (1) no additive is required in molding the iron sand to pellets, (2) metallic iron and the titanium components are easily separated by selective reduction of the iron ore by regulating the heating temperature and heating period and (3) the reduced metallic iron can be mechanically separated from the slag by means of the simple mechanical methods of crushing and magnetic dressing. Therefore, this invention is fundamentally different from the known process.

Moreover, the metallic iron obtained by the process of this invention contains very little impurities and more than 90% Fe and, therefore, has many uses. Also, the non-molten slag having a high titanium content can be used as an effective raw material for titanium production which makes the process of this invention more profitable.

EXAMPLE 1

*Sample*

| Component: | Percent | Component: | Percent |
|---|---|---|---|
| MgO | 0.99 | Total FE | 56.5 |
| P | 0.032 | $SiO_2$ | 3.55 |
| Cu | 0.008 | $TiO_2$ | 11.0 |
| S | 0.016 | CaO | Trace |
| As | Trace | $Al_2O_3$ | 0.75 |

Titanium-containing iron sand having the above composition was molded into pellets of 10 mm. in diameter without the addition of any additive.

The above-prepared raw pellets were charged in an electric-heating type crucible lined with graphite and filled with coke as a reducing agent. The temperature was raised from room temperature to 1000° C. in 10 minutes and then to 1350° C. in 75 minutes. The pellets were then withdrawn from the crucible, cooled, crushed roughly into granules of several mm. in diameter, and the slag attached to the inside surface of the iron balls was separated from the iron crust by magnetic separation.

The analytical results showed that the reduced metallic iron contained very little, if any, Ti, while the $TiO_2$ content in the slag was 70%.

EXAMPLE 2

The pellets of the sample as shown in Example 1 were charged, together with powdered coke as a reducing agent, in a closed rotary kiln of 3.5 m. in diameter and 56 m. in length, having a high temperature zone maintained at a temperature range of 1300° C. to 1450° C. After heating the pellets in the rotary kiln to 1000° C. in 1 hour, the pellets were moved to the high-temperature zone and heated therein for 1 hour. Thus, the total reduction time was 2 hours after charging the pellets in the kiln. Thereupon, the pellets were magnetically separated as in Example 1 and analysis showed that the Ti content in the reduced iron was 0 to a trace and the $TiO_2$ content in the slag was 67%.

In the above examples, no additive was added to the iron sand, but a known slag-forming agent or a bonding agent for forming pellets may be suitably used in this invention.

What is claimed is:

1. A process for separating titanium component slag from titanium-containing iron sand which comprises forming titanium-containing iron sand pellets, charging a reducing furnace with said pellets, heating said pellets from room temperature up to 1350° C. to 1500° C. in 30 to 140 minutes, while in contact with a reducing agent, until hollow balls are formed having an outer crust consisting of an outer layer composed of reduced metallic iron and an inner layer composed of slag which contains substantially all the titanium originally in the titanium-containing iron sand, removing said hollow balls from said reducing furnace after having reached said temperature, and cooling said hollow balls to ambient temperature, crushing said hollow balls and magnetically dressing the so-obtained crushed balls, thereby separating the magnetic iron from the titanium-containing slag.

2. The process according to claim 1 wherein the pellets are heated in the reducing furnace from room temperature to 1000° C. during 10 minutes to 1 hour and sequentially further heated from said temperature to 1350° C. to 1500° C. in 20 minutes to 80 minutes.

3. The process according to claim 1 wherein the pellets are heated in the reducing furnace from room temperature to 1000° C. in 15 minutes and sequentially further heated from said temperature to 1400° C. in 75 minutes.

References Cited by the Examiner

UNITED STATES PATENTS 2,811,434  10/1957  Moklebust et al. _____ 75—30

FOREIGN PATENTS 216,874  8/1958  Australia.

BENJAMIN HENKIN, *Primary Examiner.*